United States Patent
Kim et al.

(10) Patent No.: US 12,296,807 B2
(45) Date of Patent: May 13, 2025

(54) ACCELERATION LIMIT APPARATUS AND METHOD

(71) Applicants: Hyundai Motor Company, Seoul (KR); Kia Corporation, Seoul (KR)

(72) Inventors: Do Hwa Kim, Seoul (KR); Seong Wook Moon, Seoul (KR); Hui Un Son, Suwon-si (KR); Gyu Ri Lee, Namyangju-si (KR); Sung Il Jung, Busan (KR); Jae Young Park, Seongnam-si (KR); Jeong Eun Kim, Seoul (KR); Sung Bae Jeon, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 382 days.

(21) Appl. No.: 17/977,926

(22) Filed: Oct. 31, 2022

(65) Prior Publication Data
US 2023/0227013 A1 Jul. 20, 2023

(30) Foreign Application Priority Data
Jan. 17, 2022 (KR) .................. 10-2022-0006745

(51) Int. Cl.
*B60T 8/1755* (2006.01)
*B60K 28/10* (2006.01)

(52) U.S. Cl.
CPC .......... *B60T 8/17551* (2013.01); *B60K 28/10* (2013.01); *B60T 2220/06* (2013.01); *B60T 2260/00* (2013.01)

(58) Field of Classification Search
CPC . B60K 28/10; B60T 2220/06; B60T 2260/00; B60T 8/17551; B60W 2540/10; B60W 2540/12; B60W 2552/05; B60W 2556/10; B60W 2556/65; B60W 2720/106; B60W 30/143; B06W 2554/406
See application file for complete search history.

(56) References Cited

FOREIGN PATENT DOCUMENTS

| | | |
|---|---|---|
| CN | 107963081 B | 11/2019 |
| JP | 6597528 B2 | 10/2019 |
| JP | 2020-111218 A | 7/2020 |
| JP | 6907896 B2 | 7/2021 |
| KR | 10-2020-0057891 A | 5/2020 |
| KR | 102119917 B1 | 6/2020 |
| KR | 10-2020-0122897 A | 10/2020 |
| KR | 10-2021-0048636 A | 5/2021 |

*Primary Examiner* — Jaime Figueroa
*Assistant Examiner* — Zachary Joseph Wallace
(74) *Attorney, Agent, or Firm* — Banner & Witcoff, Ltd.

(57) ABSTRACT

Disclosed is an acceleration limit function relaxation apparatus. The apparatus may determine, based on information indicating manipulation of a brake pedal of a vehicle during an acceleration limit mode, that the vehicle is in a temporary braking state, determine a vehicle speed, measured at a start of the manipulation of the brake pedal, as a target vehicle speed for reacceleration, determine, based on information indicating manipulation of an accelerator pedal, that the vehicle is reaccelerated, determine an acceleration limit relaxation factor based on a cumulative braking amount calculated by measuring amounts of braking during the temporary braking state, and cause acceleration limit relaxation of the vehicle by applying the acceleration limit relaxation factor to an acceleration limit of the vehicle.

20 Claims, 4 Drawing Sheets

ACCELERATION LIMIT APPARATUS AND METHOD

This application claims priority to Korean Patent Application No. 10-2022-0006745, filed on Jan. 17, 2022, which is hereby incorporated by reference in its entirety.

BACKGROUND

Field

The present disclosure relates to an acceleration limit function relaxation apparatus and method capable of relaxing an acceleration limit until a specific target speed is reached.

Discussion of the Related Art

A speed limit assist (SLA) device, which is one of driving safety systems applied to vehicles in recent years, may limit vehicle speed so as not to exceed a speed limit set by a driver.

Also, in recent years, a function of performing control, which ensures that acceleration of a vehicle does not exceed a predetermined level of acceleration even if a driver depresses an accelerator pedal during driving of the vehicle, thereby providing smooth sense of acceleration to the driver, has been applied.

SUMMARY

Accordingly, the present disclosure is directed to an acceleration limit function relaxation apparatus and method that substantially obviate one or more problems due to limitations and disadvantages of the related art.

An object of the present disclosure is to provide an acceleration limit function relaxation apparatus and method capable of relaxing an acceleration limit until a specific target speed is reached when reacceleration is performed after temporary braking while an acceleration limit function is performed, whereby it is possible to minimizing inconvenience caused during use of the acceleration limit function.

Objects of the present disclosure devised to solve the problems are not limited to the aforementioned object, and other unmentioned objects will be clearly understood by those skilled in the art based on the following detailed description of the present disclosure.

To achieve these objects and other advantages and in accordance with the purpose of the disclosure, as embodied and broadly described herein, an apparatus may include one or more processors, and memory storing instructions that, when executed by the one or more processors, cause the apparatus to: determine, based on information indicating manipulation of a brake pedal of a vehicle during an acceleration limit mode, that the vehicle is in a temporary braking state; determine a vehicle speed, measured at a start of the manipulation of the brake pedal, as a target vehicle speed for reacceleration; determine, based on information on a manipulation of an accelerator pedal of the vehicle, that the vehicle is reaccelerated after the temporary braking state; determine an acceleration limit relaxation factor based on a cumulative braking amount calculated by measuring amounts of braking during the temporary braking state; and cause acceleration limit relaxation of the vehicle by applying the acceleration limit relaxation factor to an acceleration limit of the vehicle.

The apparatus may determine that the vehicle is in the temporary braking state further based on a determination that the manipulation of the brake pedal is performed while the vehicle is in a predetermined range of longitudinal acceleration over predetermined duration of time.

The apparatus may calculate the cumulative braking amount during the temporary braking state.

The apparatus may calculate the cumulative braking amount by integrating, over time, braking amounts during the temporary braking state.

The apparatus may calculate the cumulative braking amount by integrating, over time, the braking amounts by applying greater weights to recent values of the braking amounts relative to older values of the braking amounts.

The apparatus may determine the acceleration limit relaxation factor so as to increase the acceleration limit.

The apparatus may, based on a vehicle speed of the vehicle reaching the target vehicle speed or a predetermined acceleration limit relaxation time having elapsed, terminate the acceleration limit relaxation.

The apparatus may, based on the acceleration limit relaxation being terminated, reset, to respective initial values, the cumulative braking amount, a cumulative braking time, and the target vehicle speed.

The apparatus may output, via an output device of the vehicle, a notification, in a form of text or sound, indicating whether the acceleration limit relaxation is being performed.

According to an example method may include: determining, based on information indicating manipulation of a brake pedal of a vehicle during an acceleration limit mode, that the vehicle is in a temporary braking state; determining a vehicle speed, measured at a start of the manipulation of the brake pedal, as a target vehicle speed for reacceleration; determining, based on information indicating manipulation of an accelerator pedal of the vehicle, that the vehicle is reaccelerated after the temporary braking state; determining an acceleration limit relaxation factor based on a cumulative braking amount calculated by measuring amounts of braking during the temporary braking state; and causing acceleration limit relaxation of the vehicle by applying the acceleration limit relaxation factor to an acceleration limit of the vehicle.

Determining that the vehicle is in the temporary braking state may include determining that the vehicle is in the temporary braking state further based on a determination that the manipulation of the brake pedal is performed while the vehicle is in a predetermined range of longitudinal acceleration over a predetermined duration of time.

The method may further include calculating the cumulative braking amount during the temporary braking state.

The method may further include calculating the cumulative braking amount by integrating, over time, braking amounts during the temporary braking state.

The method may further include calculating the cumulative braking amount by integrating, over time, the braking amounts by applying greater weights to recent values of the braking amounts relative to older values of the braking amounts.

Determining the acceleration limit relaxation factor may include determining the acceleration limit relaxation factor so as to increase the acceleration limit.

The method may further include, based on a vehicle speed of the vehicle reaching the target vehicle speed or a predetermined acceleration limit relaxation time having elapsed, terminating the acceleration limit relaxation.

The method may further include, based on the acceleration limit relaxation being terminated, resetting, to respective initial values, the cumulative braking amount, a cumulative braking time, and the target vehicle speed.

The method may further include outputting, via an output device of the vehicle, a notification, in a form of text or sound, indicating whether acceleration limit relaxation is being performed.

A non-transitory computer-readable storage medium storing instructions, when executed by one or more processors, cause: determining, based on information indicating manipulation of a brake pedal of a vehicle during an acceleration limit mode, that the vehicle is in a temporary braking state; determining a vehicle speed, measured at a start of the manipulation of the brake pedal, as a target vehicle speed for reacceleration; determining, based on information indicating manipulation of an accelerator pedal of the vehicle, that the vehicle is reaccelerated after the temporary braking state; determining an acceleration limit relaxation factor based on a cumulative braking amount calculated by measuring amounts of braking during the temporary braking state; and causing acceleration limit relaxation of the vehicle by applying the acceleration limit relaxation factor to an acceleration limit of the vehicle.

The instructions, when executed by the one or more processors, may cause determining that the vehicle is in the temporary braking state further based on a determination that the manipulation of the brake pedal is performed while the vehicle is in a predetermined range of longitudinal acceleration over a predetermined duration of time.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
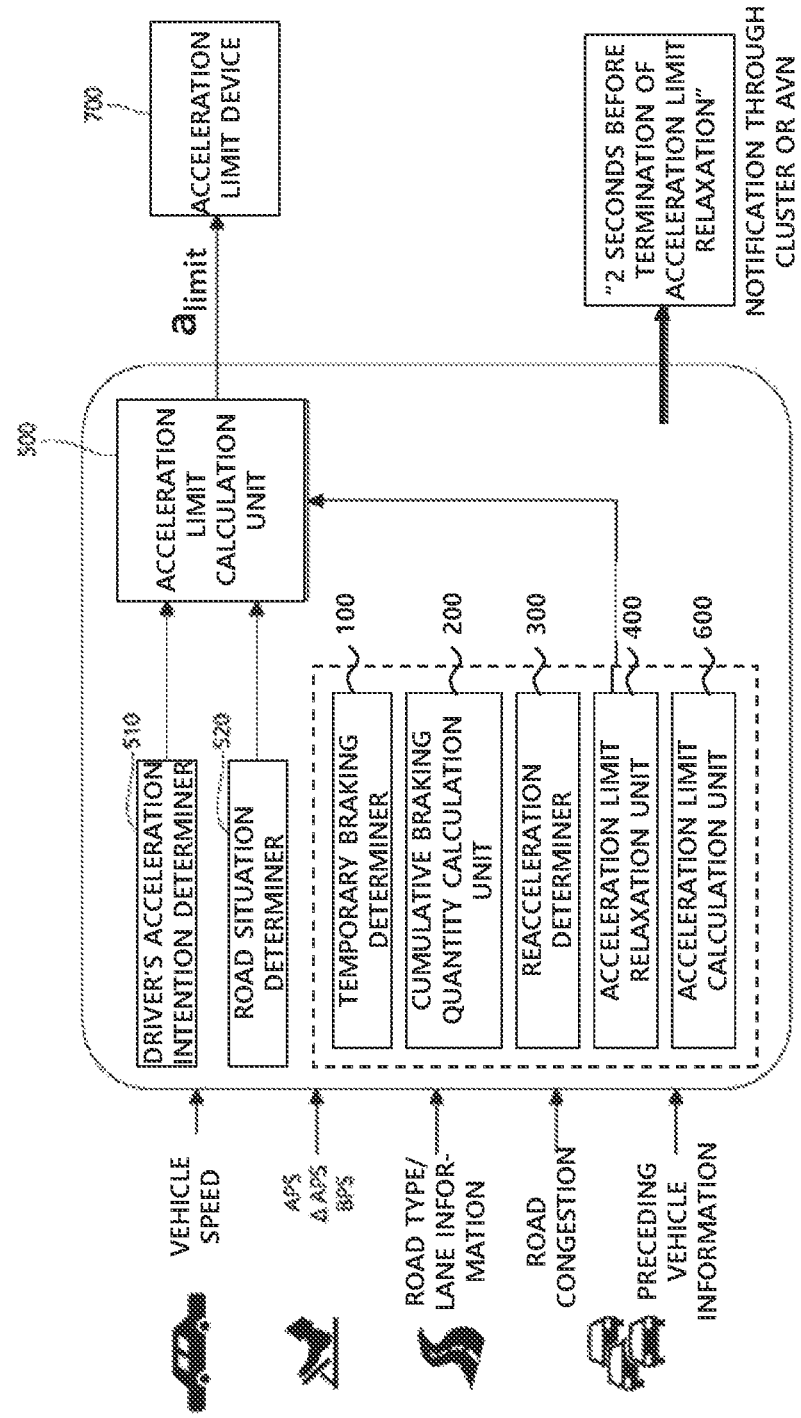
FIG. 1 is a view showing the structure of an example acceleration limit function relaxation apparatus according to the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components that may be implemented with hardware, software, or a combination of both. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms "first," "second," etc. may be used herein to describe various elements, these elements should not be limited by these terms. These terms are generally only used to distinguish one element from another and need not imply order, preference, or priority.

It will be understood that, when a component is referred to as being "connected to" or "coupled to" another component, it may be directly connected to or coupled to the other component, or intervening components may be present. In contrast, when a component is referred to as being "directly connected to" or "directly coupled to" another component, there are no intervening components present.

A singular representation may include a plural representation unless it represents a definitely different meaning from the context.

It will be further understood that the terms "comprises", "includes," "has," and the like, when used in this specification, specify the presence of stated features, numbers, steps, operations, elements, components or combinations thereof, but do not preclude the presence or addition of one or more other features, numbers, steps, operations, elements, components, or combinations thereof.

In addition, "unit" or "control unit" included in names, such as a motor control unit and a hybrid control unit, is a term that is widely used to name a controller that controls a specific function of a vehicle, but does not mean a generic functional unit. For example, each control unit may include a communication device that communicates with another control unit or a sensor in order to control an assigned function, a memory that stores an operating system, logic commands, and input and output information, and at least one processor that performs determination, calculation, and decision necessary to control the assigned function. Two or more units and/or control units may be combined into one unit and/or control unit.

In order to provide smooth sense of acceleration, accelerator position sensor (APS) may have been used for scale correction of correcting the degree of accelerator pedal manipulation (APS value) using a scale having a predetermined rate, thereby weakening the degree of acceleration according to a predetermined acceleration limit level even when the accelerator pedal is forcefully depressed.

When the APS scale correction is performed, however, reactivity in which the vehicle is accelerated in response to driver's manipulation of the accelerator pedal may be delayed. In particular, during driving on an upward ramp, acceleration performance may be greatly deteriorated, and therefore acceleration performance intended by the driver may not be achieved.

In addition, temporary deceleration may be necessary with an acceleration limit function enabled, such as when a vehicle passes through a speed limit enforcement section of the road or when the vehicle passes through a tollgate. When the accelerator pedal is depressed for rapid return to the state before deceleration after passing through a section in which deceleration is necessary, however, the driver is frustrated until the vehicle return to the state before deceleration, since the acceleration limit function is still enabled.

Hereinafter, embodiments of the present disclosure will be described in detail with reference to the accompanying drawings.

Figure 2:
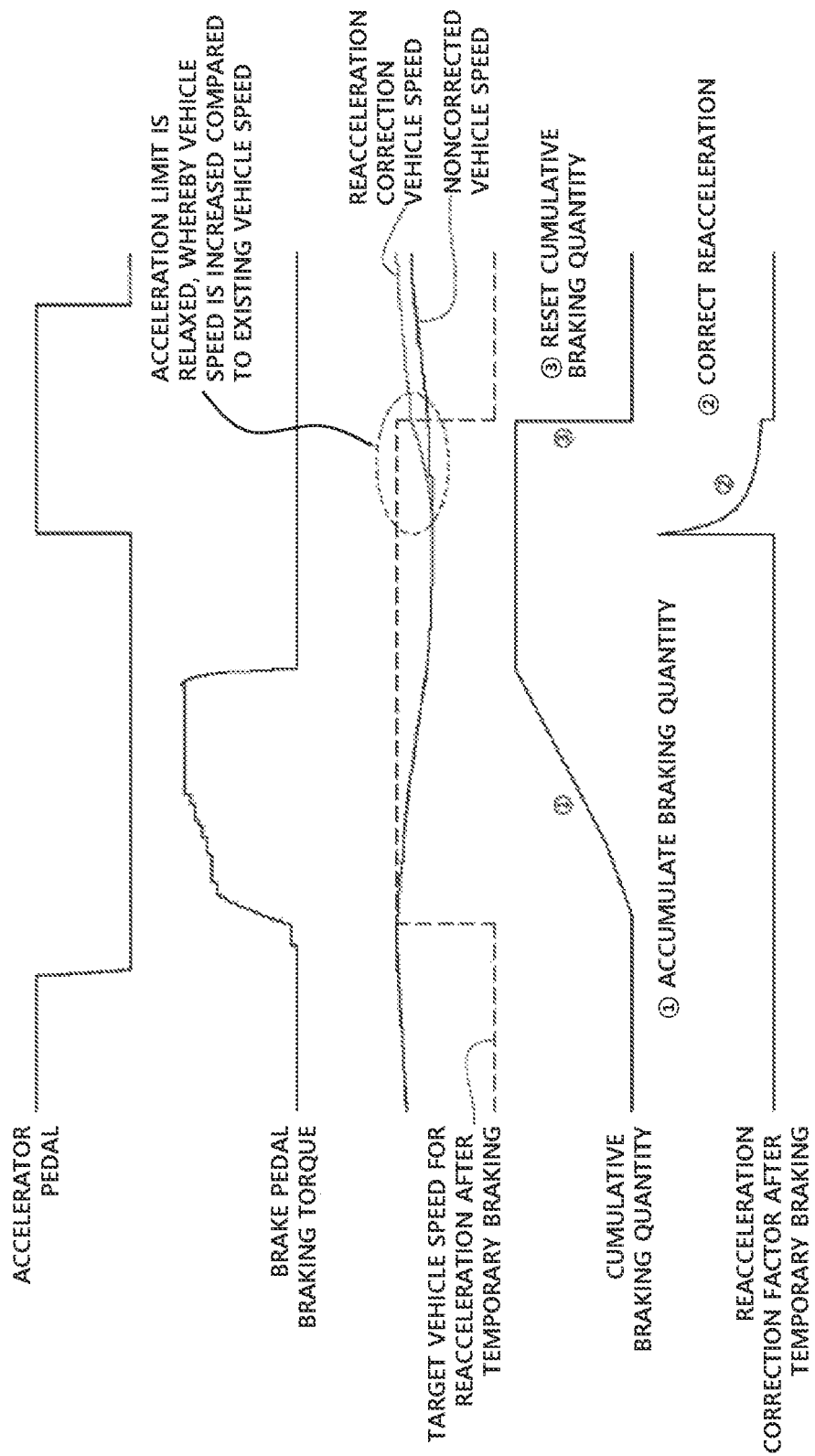
FIG. 2 is a graph showing an example of temporarily relaxing an acceleration limit at the time of reacceleration after temporary braking.

FIG. 1 is a view showing the structure of an example acceleration limit function relaxation apparatus according to the present disclosure, and FIG. 2 is a graph showing an example of temporarily relaxing an acceleration limit at the time of reacceleration after temporary braking according to the present disclosure.

Referring to FIG. 1, the acceleration limit function relaxation apparatus may include a temporary braking determiner 100 configured to determine that temporary braking is performed upon receiving brake pedal manipulation information (e.g., brake position sensor (BPS) value) from a control unit of a vehicle that is driven within a predetermined range of vehicle speeds with an acceleration limit function enabled and to set the vehicle speed when the brake pedal is manipulated as a target vehicle speed at the time of reacceleration. The acceleration limit function relaxation apparatus may include a reacceleration determiner 300 configured to determine that reacceleration is performed upon receiving accelerator pedal manipulation information from the control unit of the vehicle that is temporarily braked. The acceleration limit function relaxation apparatus may include an acceleration limit relaxation unit 400 configured to set an acceleration limit relaxation factor necessary to reach the target vehicle speed based on a cumulative braking quantity (e.g., amount) calculated by accumulating a braking quantity (e.g., amount) during the temporary braking and to apply the set acceleration limit relaxation factor for calculation of limit acceleration.

When the brake pedal, of the vehicle driven within a predetermined range of vehicle speeds for a predetermined time or more, is depressed, the temporary braking determiner 100 may determine that temporary braking is to be performed.

That is, when the vehicle is driven within a predetermined range of vehicle speeds for a predetermined time or more, this may be interpreted as a sign that a driver has an intention of maintaining the current driving state (e.g., current driving speed). Consequently, the temporary braking determiner 100 may determine that the temporary braking has a possibility of returning to the original driving state after the current specific situation is resolved (e.g., after passing through a photo enforcement area) even if the brake pedal is manipulated.

In addition, the temporary braking determiner 100 may determine that the temporary braking is s performed even upon receiving the brake pedal manipulation information while longitudinal acceleration of the vehicle is maintained within a predetermined range for a predetermined time or more.

The temporary braking determiner 100 may set the vehicle speed when the brake pedal starts to be depressed as a target vehicle speed that the vehicle must reach when the vehicle is reaccelerated and may store the same in a memory provided in the control unit. That is, the target vehicle speed may be set as one of termination conditions for terminating acceleration limit relaxation performed during reacceleration after termination of temporary braking.

At this time, when the brake pedal chatters, the temporary braking determiner 100 may set the vehicle speed when the brake pedal is depressed first or when the brake pedal is depressed last as a target vehicle speed.

The target vehicle speed thus set may be corrected by inclination of a road on which the vehicle is driven, preceding (e.g., leading) vehicle information, and/or braking deceleration. That is, when the road on which the vehicle is driven is an upward ramp, the target vehicle speed may be increased. When the road on which the vehicle is driven is a downward ramp, the target vehicle speed may be decreased. Alternatively, the target vehicle speed may be decreased for the upward ramp, and the target vehicle speed may be increased for the downward ramp.

In addition, when the distance between the vehicle that is temporarily braked and the preceding vehicle is long (e.g., greater than a threshold distance), the target vehicle speed may be increased. When the distance between the vehicle that is temporarily braked and the preceding vehicle is short (e.g., less than a threshold distance), the target vehicle speed may be decreased.

The acceleration limit function relaxation apparatus may further include a cumulative braking quantity calculation unit 200 configured to calculate a cumulative braking quantity during the temporary braking by accumulating braking quantities and braking time using at least one piece of braking information received from the control unit of the vehicle while the brake pedal is depressed for the temporary braking.

Braking information that the cumulative braking quantity calculation unit 200 receives from the control unit of the vehicle may include brake pedal manipulation information (e.g., BPS value), braking torque, braking power, master cylinder pressure of the brake, and vehicle speed decrement.

At this time, the cumulative braking quantity calculation unit 200 may calculate the cumulative braking quantity (e.g., amount) by integrating braking quantities accumulated during braking time. In addition, the cumulative braking quantity calculation unit 200 may calculate the cumulative braking quantity (e.g., amount) by integral using a forgetting factor to increase relative importance of recent values.

In addition, the cumulative braking quantity calculation unit 200 may determine that temporary braking is performed until the accelerator pedal is manipulated even when the driver repeatedly depresses and releases the brake pedal, and may accumulate a braking quantity (e.g., amount).

In addition, upon receiving accelerator pedal manipulation information in the state in which the cumulative braking quantity (e.g., amount) is not 0, the reacceleration determiner 300 may determine that temporary braking has been terminated and reacceleration is being performed.

When only coasting is performed without manipulation of the brake pedal, therefore, this does not correspond to reacceleration to which relaxation of the acceleration limit function according to the present disclosure is applied but to the case in which only a cumulative braking quantity (e.g., amount) by manipulation of the brake pedal is present.

At this time, in determining whether the cumulative braking quantity is not 0, the reacceleration determiner 300 may correct the cumulative braking quantity in consideration of the target vehicle speed and elapsed time after the driver releases the brake pedal.

That is, if the difference between the target vehicle speed and the current vehicle speed of the vehicle is not great (e.g., less than a threshold value), the cumulative braking quantity may be reduced, since usefulness of acceleration limit relaxation may not be great. In addition, when elapsed time after the driver releases the brake pedal is long (e.g., greater than a threshold value), the cumulative braking quantity may be reduced, since the driver's intention of acceleration may not be great.

In addition, the acceleration limit relaxation unit 400 may set an acceleration limit relaxation factor indicating the degree of acceleration limit relaxation necessary to reach the target vehicle speed based on the cumulative braking quantity, and may transmit the same to an acceleration limit calculation unit 500 configured to calculate limit acceleration by the acceleration limit function.

At this time, the acceleration limit relaxation factor may be set in consideration of a cumulative braking time, a target vehicle speed reach rate, and elapsed time of acceleration limit relaxation as well as the cumulative braking quantity.

Since the acceleration limit relaxation factor is used to relax an acceleration limit caused by the acceleration limit function, the acceleration limit relaxation factor may be set so as to increase limit acceleration $a_{limit}$.

In addition, when the cumulative braking time is short (e.g., rapid deceleration), the acceleration limit relaxation factor may be set to a large value, and the acceleration limit relaxation time may be set to be short. When the cumulative braking time is long (e.g., slow deceleration), the acceleration limit relaxation factor may be set to a small value, and the acceleration limit relaxation time may be set to be long.

If rapid deceleration is performed, therefore, more rapid return to the target speed may be possible at the time of reacceleration. When slow deceleration is performed, return to the target speed may be possible under gentle sense of acceleration without rapid speed change. In addition, when the driver tends toward rapid return to the target vehicle speed after slow deceleration, the acceleration limit relaxation factor and the acceleration limit relaxation time may be variously set depending on the tendency of the driver.

In addition, the acceleration limit relaxation unit 400 may set the acceleration limit relaxation time based on the cumulative braking quantity and the cumulative braking time. If the acceleration limit relaxation factor is set to a large value (e.g., above a threshold value), therefore, the acceleration limit relaxation time may be set to be short, since the limit acceleration may be greatly increased.

When the acceleration limit relaxation factor is set to a small value (e.g., below a threshold value), the acceleration limit relaxation time may be set to be long, since the limit acceleration cannot be greatly increased.

In addition, if the vehicle speed of the vehicle that is reaccelerated reaches the target vehicle speed or if a predetermined acceleration limit relaxation time has elapsed, the acceleration limit relaxation unit 400 may terminate acceleration limit relaxation.

Consequently, it may be possible to rapidly return the speed of the vehicle to the target vehicle speed during acceleration limit relaxation, whereby it may be possible to relieve inconvenience that may be caused by the acceleration limit function. In addition, the acceleration limit relaxation state may be maintained for a sufficient time even when return to the target vehicle speed is not achieved, whereby driving suitable for the driver's intention of acceleration may be performed.

At this time, when the acceleration limit relaxation is terminated, the acceleration limit relaxation unit 400 may reset the cumulative braking quantity, the cumulative braking time, and the target vehicle speed set based on the existing temporary braking situation to initial values (e.g., zero) in order to prepare for a subsequent temporary braking situation.

In addition, the acceleration limit function relaxation apparatus may further include an acceleration limit relaxation notification unit 600 configured to produce a notification indicating whether the acceleration limit relaxation is being performed in the form of text or voice using an output device provided in the vehicle such that the driver can recognize whether the acceleration limit relaxation is being performed.

Consequently, the acceleration limit relaxation notification unit 600 may notify the driver that the acceleration limit relaxation is being performed in the reacceleration situation after the temporary braking through a cluster or an audio, video, and navigation (AVN) system.

At this time, as shown in FIG. 1, the acceleration limit relaxation notification unit 600 may also produce a notification indicating the remaining acceleration limit relaxation time in order to encourage the driver, who may have the intention of acceleration, to return to the target speed.

In addition, upon receiving the acceleration limit relaxation factor set by the acceleration limit relaxation unit 400, the acceleration limit calculation unit 500 may calculate new limit acceleration $a_{limit}$ by reflecting the acceleration limit relaxation factor in the limit acceleration $a_{limit}$ calculated by the acceleration limit function that is already being performed, and may output the same to an acceleration limit device 700.

At this time, the acceleration limit calculation unit 500 may calculate relaxed limit acceleration by adding or multiplying the acceleration limit relaxation factor to or by the limit acceleration $a_{limit}$ calculated before the acceleration limit relaxation in order to increase the limit acceleration by a predetermined size or a predetermined rate.

In addition, the acceleration limit calculation unit 500 may calculate limit acceleration using the results of determination by an acceleration intention determiner 510 configured to determine the driver's intention of acceleration and the degree of acceleration based on the degree of accelerator pedal manipulation (e.g., accelerator position sensor (APS) value) and a road situation determiner 520 configured to determine whether the road on which the vehicle is driven is a road suitable to relax the acceleration limit and to perform additional acceleration based on the type of the road, lane information, road congestion, and preceding vehicle information.

An example of temporarily relaxing the acceleration limit at the time of reacceleration after temporary braking will be described with reference to FIG. 2.

It can be seen from a first graph and a second graph of FIG. 2 that the driver releases the accelerator pedal during acceleration, depresses the brake pedal to perform braking, and depresses the accelerator pedal again to perform acceleration. Also, it can be seen that braking is performed only for a relatively short time and then acceleration is performed, and therefore temporary braking and subsequent reacceleration are performed.

At this time, as shown in a fourth graph of FIG. 2, the cumulative braking quantity calculation unit 200 may calculate a cumulative braking quantity by accumulating a braking quantity (e.g., amount of braking torque) after braking torque is generated by manipulation of the brake pedal before the brake pedal is released.

Subsequently, when the driver depresses the accelerator pedal, the acceleration limit relaxation unit 400 may set an acceleration limit relaxation factor, which is a correction (e.g., adjustment) factor at the time of reacceleration set based on the cumulative braking quantity, and may transmit the same to the acceleration limit calculation unit 500.

The acceleration limit calculation unit 500 may correct (e.g., adjust) limit acceleration by applying the acceleration limit relaxation factor, thereby achieving an increase to vehicle speed closer to the target vehicle speed than the existing vehicle speed (e.g., vehicle speed before application of acceleration limit relaxation), as shown in a third graph. As shown in the graph, the target vehicle speed may be set as vehicle speed when the brake pedal starts to be manipulated and the set state is maintained until the cumulative braking quantity is reset.

Hereinafter, an example acceleration limit function relaxation method will be described with reference to FIGS. 3 and 4.

Figure 3:
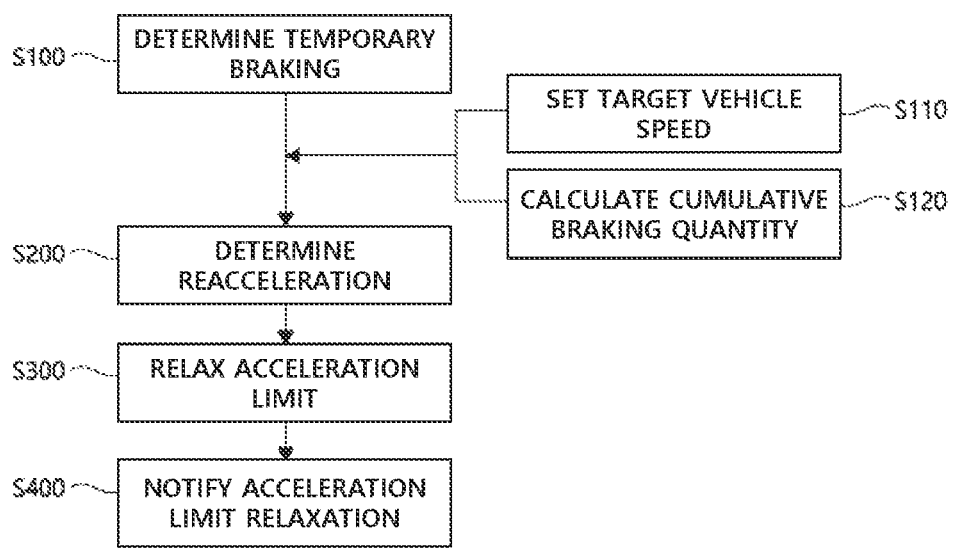
FIG. 3 is a flowchart showing an acceleration limit function relaxation method.
Figure 4:
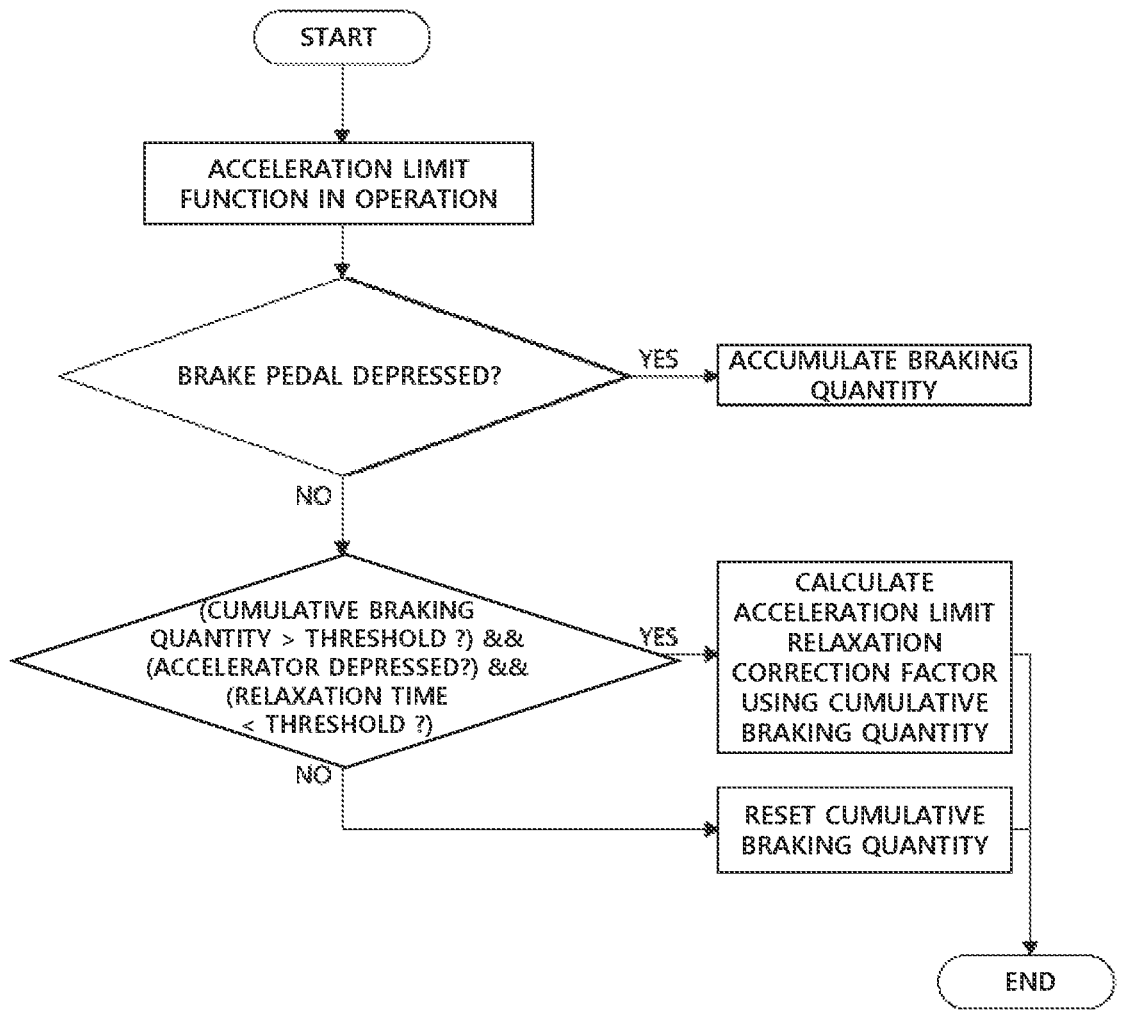
FIG. 4 is a flowchart showing a mechanism of temporarily relaxing an acceleration limit at the time of reacceleration after temporary braking.

Referring to FIGS. 3 and 4, the acceleration limit function relaxation method may include determining a temporary braking determination (S100) by determining that temporary braking is performed upon receiving brake pedal manipulation information from a control unit of a vehicle that is driven within a predetermined range of vehicle speeds in the state in which an acceleration limit function is enabled and setting the vehicle speed when the brake pedal is manipulated as a target vehicle speed at the time of reacceleration. The system may determine reacceleration (S200) by determining that reacceleration is performed upon receiving accelerator pedal manipulation information from the control unit of the vehicle that is temporarily braked. The system may relax an acceleration limit (S300) by setting an acceleration limit relaxation factor necessary to reach the target vehicle speed based on a cumulative braking quantity calculated by accumulating a braking quantity during the temporary braking and applying the set acceleration limit relaxation factor for calculation of limit acceleration.

When determining temporary braking (S100), temporary braking may be performed if the brake pedal of the vehicle driven within a predetermined range of vehicle speeds for a predetermined time or more is depressed.

At S100, it may be determined that the temporary braking is performed even upon receiving the brake pedal manipulation information while longitudinal acceleration of the vehicle is maintained within a predetermined range for a predetermined time or more.

The acceleration limit function relaxation method may further include setting a target vehicle speed (S110) by setting the vehicle speed when the brake pedal starts to be depressed as a target vehicle speed that the vehicle must reach when the vehicle is reaccelerated and storing the same in a memory. At this time, the target vehicle speed may be a criterion based on which it may be determined whether the vehicle returns to the state before the temporary braking, and therefore the target vehicle speed may be set as one of termination conditions necessary to determine whether acceleration limit relaxation is terminated.

At S110, the target vehicle speed may be corrected by inclination of a road on which the vehicle is driven, preceding (e.g., leading) vehicle information, and braking deceleration. Consequently, the situation of the road on which the vehicle is driven at the time of reacceleration may be considered as an increase or decrease form of the target vehicle speed.

In addition, the acceleration limit function relaxation method may further include calculating a cumulative braking quantity (S120) by calculating a cumulative braking quantity during the temporary braking by accumulating braking quantities and braking time using at least one piece of braking information received from the control unit of the vehicle while the brake pedal is depressed for the temporary braking.

At this time, the braking information received from the control unit of the vehicle may include brake pedal manipulation information (BPS value), braking torque, braking power, master cylinder pressure of the brake, and vehicle speed decrement.

In the cumulative braking quantity calculation step (S120), the cumulative braking quantity may be calculated by integrating braking quantities accumulated during braking time. In particular, the cumulative braking quantity may be calculated by integral using a forgetting factor to increase relative importance of recent values.

When determining the reacceleration (S200), it may be determined that temporary braking is terminated and reacceleration is performed upon receiving accelerator pedal manipulation information in the state in which the cumulative braking quantity is not 0.

Relaxing the acceleration limit (S300) may include setting an acceleration limit relaxation factor indicating the degree of acceleration limit relaxation necessary to reach the target vehicle speed based on the cumulative braking quantity, and the same may be transmitted to an acceleration limit calculation unit configured to calculate limit acceleration by the acceleration limit function.

Since the acceleration limit relaxation factor is used to relax the acceleration limit caused by the acceleration limit function, the acceleration limit relaxation factor may be set so as to increase limit acceleration $a_{limit}$.

When the cumulative braking time is short (i.e. rapid deceleration), the acceleration limit relaxation factor may be set to a large value, and the acceleration limit relaxation time may be set to be short. When the cumulative braking time is long (i.e. slow deceleration), the acceleration limit relaxation factor may be set to a small value, and the acceleration limit relaxation time may be set to be long.

Relaxing the acceleration limit (S300) may include setting the acceleration limit relaxation time based on the cumulative braking quantity and the cumulative braking time. When the acceleration limit relaxation factor is set to a large value, therefore, the acceleration limit relaxation time may be set to be short, since the limit acceleration may be greatly increased.

When the acceleration limit relaxation factor is set to a small value, the acceleration limit relaxation time may be set to be long, since the limit acceleration cannot be greatly increased.

At S300), acceleration limit relaxation may be terminated when the vehicle speed of the vehicle that is reaccelerated reaches the target vehicle speed or when a predetermined acceleration limit relaxation time has elapsed.

At S300, the cumulative braking quantity, the cumulative braking time, and the target vehicle speed set based on the existing temporary braking situation may be reset to initial values when the acceleration limit relaxation is terminated.

In addition, the acceleration limit function relaxation method may further include notifying acceleration limit relaxation (S400) by producing (e.g., providing) a notification indicating whether the acceleration limit relaxation is being performed in the form of text or voice using an output device provided in the vehicle such that the driver can recognize whether the acceleration limit relaxation is being performed.

At S400, the driver may be notified that the acceleration limit relaxation is being performed in the reacceleration situation after the temporary braking and of the remaining acceleration limit relaxation time through a cluster or an audio, video, and navigation (AVN) system.

The present disclosure may be implemented as a computer-readable program stored in a computer-readable recording medium. The computer-readable medium may be any type of recording device in which data is stored in a computer-readable manner. The computer-readable medium may include, for example, a hard disk drive (HDD), a solid state disk (SSD), a silicon disk drive (SDD), a read-only memory (ROM), a random access memory (RAM), a compact disc read-only memory (CD-ROM), a magnetic tape, a floppy disk, and an optical data storage device.

As is apparent from the above description, in various embodiments of the present disclosure described above, when a vehicle performing an acceleration limit function is temporarily decelerated, acceleration limit is temporarily relaxed until the state of the vehicle returns to the original state, whereby it is possible to secure responsibility corresponding to a driver's intention of acceleration.

Effects obtainable from the present disclosure are not limited by the above mentioned effects, and other unmentioned effects can be clearly understood from the above description by those having ordinary skill in the technical field to which the present disclosure pertains.

The above detailed description is not to be construed as limiting the present disclosure in any aspect, but is to be considered by way of example. The scope of the present disclosure should be determined by reasonable the interpretation of accompanying claims, and all equivalent modifications made without departing from the scope of the present disclosure should be understood as being included in the following claims.

What is claimed is:

1. An apparatus comprising:
   one or more processors; and
   memory storing instructions that, when executed by the one or more processors, cause the apparatus to:
      determine, based on information indicating manipulation of a brake pedal of a vehicle during an acceleration limit mode, that the vehicle is in a temporary braking state;
      determine a vehicle speed, measured at a start of the manipulation of the brake pedal, as a target vehicle speed for reacceleration;
      determine, based on information on a manipulation of an accelerator pedal of the vehicle, that the vehicle is reaccelerated after the temporary braking state;
      determine an acceleration limit relaxation factor based on a cumulative braking amount calculated by measuring amounts of braking during the temporary braking state; and
      cause acceleration limit relaxation of the vehicle by applying the acceleration limit relaxation factor to an acceleration limit of the vehicle.

2. The apparatus according to claim 1, wherein the instructions, when executed by the one or more processors, cause the apparatus to determine that the vehicle is in the temporary braking state further based on a determination that the manipulation of the brake pedal is performed while the vehicle is in a predetermined range of longitudinal acceleration over a predetermined duration of time.

3. The apparatus according to claim 1, wherein the instructions, when executed by the one or more processors, further cause the apparatus to calculate the cumulative braking amount during the temporary braking state.

4. The apparatus according to claim 1, wherein the instructions, when executed by the one or more processors, further cause the apparatus to calculate the cumulative braking amount by integrating, over time, braking amounts during the temporary braking state.

5. The apparatus according to claim 4, wherein the instructions, when executed by the one or more processors, further cause the apparatus to calculate the cumulative braking amount by integrating, over time, the braking amounts by applying greater weights to recent values of the braking amounts relative to older values of the braking amounts.

6. The apparatus according to claim 1, wherein the instructions, when executed by the one or more processors, cause the apparatus to determine the acceleration limit relaxation factor so as to increase the acceleration limit.

7. The apparatus according to claim 1, wherein the instructions, when executed by the one or more processors, further cause the apparatus to, based on a vehicle speed of the vehicle reaching the target vehicle speed or a predetermined acceleration limit relaxation time having elapsed, terminate the acceleration limit relaxation.

8. The apparatus according to claim 1, wherein the instructions, when executed by the one or more processors, further cause the apparatus to, based on the acceleration limit relaxation being terminated, reset, to respective initial values, the cumulative braking amount, a cumulative braking time, and the target vehicle speed.

9. The apparatus according to claim 1, wherein the instructions, when executed by the one or more processors, further cause the apparatus to output, via an output device of the vehicle, a notification, in a form of text or sound, indicating whether the acceleration limit relaxation is being performed.

10. A method comprising:
   determining, based on information indicating manipulation of a brake pedal of a vehicle during an acceleration limit mode, that the vehicle is in a temporary braking state;
   determining a vehicle speed, measured at a start of the manipulation of the brake pedal, as a target vehicle speed for reacceleration;
   determining, based on information indicating manipulation of an accelerator pedal of the vehicle, that the vehicle is reaccelerated after the temporary braking state;
   determining an acceleration limit relaxation factor based on a cumulative braking amount calculated by measuring amounts of braking during the temporary braking state; and
   causing acceleration limit relaxation of the vehicle by applying the acceleration limit relaxation factor to an acceleration limit of the vehicle.

11. The method according to claim 10, wherein the determining that the vehicle is in the temporary braking state comprises determining that the vehicle is in the temporary braking state further based on a determination that the manipulation of the brake pedal is performed while the vehicle is in a predetermined range of longitudinal acceleration over a predetermined duration of time.

12. The method according to claim 10, further comprising calculating the cumulative braking amount during the temporary braking state.

13. The method according to claim 10, further comprising calculating the cumulative braking amount by integrating, over time, braking amounts during the temporary braking state.

14. The method according to claim 13, further comprising calculating the cumulative braking amount by integrating, over time, the braking amounts by applying greater weights to recent values of the braking amounts relative to older values of the braking amounts.

15. The method according to claim 10, wherein the determining the acceleration limit relaxation factor comprises determining the acceleration limit relaxation factor so as to increase the acceleration limit.

16. The method according to claim 10, further comprising, based on a vehicle speed of the vehicle reaching the target vehicle speed or a predetermined acceleration limit relaxation time having elapsed, terminating the acceleration limit relaxation.

17. The method according to claim 10, further comprising, based on the acceleration limit relaxation being terminated, resetting, to respective initial values, the cumulative braking amount, a cumulative braking time, and the target vehicle speed.

18. The method according to claim 10, further comprising outputting, via an output device of the vehicle, a notification, in a form of text or sound, indicating whether acceleration limit relaxation is being performed.

19. A non-transitory computer-readable storage medium storing instructions, when executed by one or more processors, cause:
  determining, based on information indicating manipulation of a brake pedal of a vehicle during an acceleration limit mode, that the vehicle is in a temporary braking state;
  determining a vehicle speed, measured at a start of the manipulation of the brake pedal, as a target vehicle speed for reacceleration;
  determining, based on information indicating manipulation of an accelerator pedal of the vehicle, that the vehicle is reaccelerated after the temporary braking state;
  determining an acceleration limit relaxation factor based on a cumulative braking amount calculated by measuring amounts of braking during the temporary braking state; and
  causing acceleration limit relaxation of the vehicle by applying the acceleration limit relaxation factor to an acceleration limit of the vehicle.

20. The non-transitory computer-readable storage medium according to claim 19, wherein the instructions, when executed by the one or more processors, cause the determining that the vehicle is in the temporary braking state further based on a determination that the manipulation of the brake pedal is performed while the vehicle is in a predetermined range of longitudinal acceleration over a predetermined duration of time.

* * * * *